June 12, 1951 K. S. DUNLAP ET AL 2,556,172

SIGNALING OR DIALING SYSTEM

Filed Dec. 29, 1949 4 Sheets-Sheet 1

INVENTORS K. S. DUNLAP
C. A. LOVELL

BY William F. Simpson

ATTORNEY

INVENTORS K. S. DUNLAP
C. A. LOVELL
BY *William F. Simpson.*
ATTORNEY

June 12, 1951 K. S. DUNLAP ET AL 2,556,172
SIGNALING OR DIALING SYSTEM
Filed Dec. 29, 1949 4 Sheets-Sheet 3

INVENTORS K. S. DUNLAP
C. A. LOVELL
BY William F. Simpson.
ATTORNEY

FIG. 10A GENERATION OF START PULSES

FIG. 10B GENERATION OF PULSES REPRESENTING DIGIT 1

FIG. 10C GENERATION OF PULSES REPRESENTING DIGIT 5

FIG. 10D GENERATION OF PULSES REPRESENTING DIGIT 10

FIG. 10E THE START PULSES AND PULSES REPRESENTING THE DIGIT 5 AS APPLIED TO THE LINE DURING ONE CYCLE OF THE EXCITATION PERIOD.

INVENTORS K. S. DUNLAP
C. A. LOVELL
BY William F. Simpson.
ATTORNEY

Patented June 12, 1951 2,556,172

UNITED STATES PATENT OFFICE 2,556,172

SIGNALING OR DIALING SYSTEM

Kermit S. Dunlap and Clarence A. Lovell, Summit, N. J., assignors to Bell Telephone Laboratories, Incorporated, New York, N. Y., a corporation of New York Application December 29, 1949, Serial No. 135,794

3 Claims. (Cl. 177—380)

This invention relates to improvements in telephone call signal apparatus, circuits, and methods, and more specifically to improvements in telephone call signaling apparatus, circuits, and methods disclosed in two applications of Parkinson, Serial No. 39,015, filed July 16, 1948, now Patent 2,499,606, granted March 7, 1950, and Serial No. 131,875, filed December 8, 1949, which calling apparatus and circuits are of the preset type and generate pulses of electric current which may be transmitted over voice frequency telephone channels.

An object of the present invention is to simplify and reduce the amount of equipment necessary at a subscriber's station for generating electrical signaling current pulses of the type required in systems such as set forth in the above-identified Parkinson patent application.

Another object of this invention is to reduce interfering currents and require less power for generating the signaling pulses by generating only those pulses which are necessary to transmit the necessary signals over the subscriber's line.

Another object of this invention is to provide a saturable impulse generating coil having an output winding and a single input winding the ends of which are connected to two phases of an alternating current source which have a common connection. Different ones of the taps are then connected to this common connection in accordance with the time at which it is desired to generate a pulse in the output circuit.

In the above-identified application call signal generating apparatus is disclosed for generating pulses in which the magnitude or identity of each digit of the called subscriber's station identification or number is represented by the time elapsing between a start or reference pulse and a stop or digit pulse. In transmitting pulses of short duration over voice frequency transmission paths difficulty is frequently encountered due to transients set up by the pulses. The transients are usually decaying alternating currents which are caused by resonant circuits incorporated in transmission paths, repeat coils, filters, and other transmission equipment. Transients resulting from the application of short pulses to such equipment frequently last a number of cycles and thus for an appreciable interval of time after an exciting pulse has terminated.

In accordance with the invention set forth in the above-identified patent application of Parkinson, Serial No. 39,015, the signaling pulses are spaced in time so that ample time is allowed for the transients, associated with or appearing incident to the application of each of the signaling pulses to the transmission system, to die out sufficiently so that they will not interfere with the next signaling pulse, thus preventing interaction between the various pulses representing the digits of the called number.

In the above-identified application, Serial No. 39,015, eleven impulse coils, each comprising a core of saturable material and a plurality of windings, are provided for generating the various pulses. Thus the start pulse and ten stop pulses were generated for each digit and selecting means is provided for selecting the desired one of the stop pulses.

In accordance with the present invention only two impulse coils, each having a core of saturable material and a plurality of windings are provided, one for generating the start pulse and one for generating the stop pulse. The time of generation of the stop pulse is controlled by a selective switch and distributor which varies the number of turns of different windings of the stop pulse coil. Such an arrangement requires less power which is usually supplied over the subscriber's line, and in addition prevents cross-talk or interference from the stop pulse coils not selected when all of the stop pulses are generated for each digit as disclosed in the arrangement described in the above-identified application of Parkinson, Serial No. 39,015.

These and other objects and features of the invention will be apparent from the following description, the appended claims, and the drawings, in which:

Figures 10, 10A, 10B, 10C, 10D, 10E:
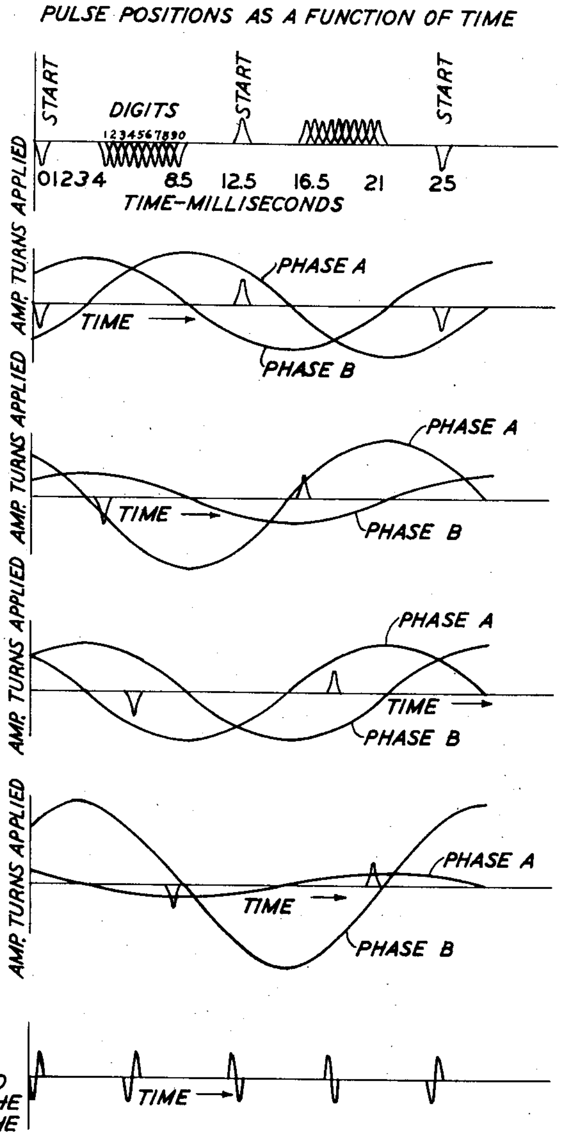

Fig. 10 indicates possible or assigned pulse positions as a function of time;

Fig. 10A indicates the start pulses generated in the secondary winding and the ampere turns in the primary windings of the transformer for generating the start pulses during one cycle of the excitation current;

Fig. 10B indicates the stop pulses generated in the secondary winding and the ampere turns in each of the primary windings of the transformer for generating the pulses representing the digit 1 during one cycle of the excitation current;

Fig. 10C indicates the stop pulses generated in the secondary winding and the ampere turns in each of the primary windings of the transformer for generating the pulses representing the digit 5 during one cycle of the excitation current;

Fig. 10D indicates the stop pulses generated in the secondary winding and the ampere turns in each of the primary windings of the transformer for generating the pulses representing the digit 0 during one cycle of the excitation current; and Fig. 10E indicates the start pulses and the stop pulses representing the digit 5, as generated during one cycle of the excitation current.

The manner in which the apparatus disclosed in this application may be incorporated in a complete telephone system is disclosed in copending application Serial No. 35,925 of W. A. Malthaner, filed June 29, 1948. Suitable types of equipment for responding to the signaling pulses transmitted from the apparatus disclosed herein is disclosed in the copending applications of H. E. Vaughan, Serial No. 35,911, filed June 29, 1948; and W. A. Malthaner, N. D. Newby, and H. E. Vaughan, Serial No. 35,924, filed June 29, 1948.

A similar signaling device is disclosed in copending applications Serial No. 35,930 of D. B. Parkinson, filed June 29, 1948; Serial No. 35,927 of C. A. Lovell and D. B. Parkinson, filed June 29, 1948; and Serial No. 35,926 of C. A. Lovell and D. B. Parkinson, filed June 29, 1948; and Serial No. 135,795, filed January 29, 1949, of Dunlap-Lovell.

Novel features disclosed but not claimed herein are claimed in different ones of the above-identified applications.

In the exemplary embodiment shown herein, provision is made for the generation of pulse representations of eight characters during each cycle of operation, and these pulses are repeatedly generated as long as the excitation current is applied. Any arbitrarily chosen number of representations of characters (within reasonable limits) may be generated by properly designed signaling apparatus. A maximum of eight representations of characters was selected for this disclosure since eight-character calling numbers are in common use in telephone systems. It will be understood that these characters may be digits or letters or a combination of the two as commonly used in designating telephone calls. Each of the digits 0 to 9 will be represented by a different combination of two pulses, the pulse combination representing the digit 2 will also represent the letters A, B and C; the pulse combination representing the digit 3 will also represent the letters D, E and F; and so on. Hereinafter each combination of eight characters will be referred to as each called number irrespective of whether the combination comprises digits or letters and digits.

In accordance with an exemplary embodiment of this invention, each of the pulses generated is of about 1 millisecond in duration. When pulses of this duration are transmitted over various types of voice frequency communication paths encountered in telephone systems, about 3½ milliseconds are required for the longest transients to die out sufficiently so that the succeeding pulse may be accurately recognized without interference from the transient caused by the previous pulse. In other words each transmitted pulse of approximately 1 millisecond duration is in effect lengthened to a decaying alternating current of approximately 3½ milliseconds duration. At the end of this 3½ milliseconds period or any time thereafter a second pulse may be transmitted.

The signaling system employed in this embodiment of the invention comprises a start pulse coil for generating a start pulse of 1 millisecond duration for each character, the start pulses being generated at 12½ milliseconds intervals as long as the pulsing transformers are energized, and a stop pulse of 1 millisecond duration for each character, each stop pulse reaching its peak value during the 4 to 8½ milliseconds interval of time after the start pulse has reached its peak value. In order to provide sufficient margins of safety to permit reliable signaling, 4 milliseconds are allowed for the decay of each pulse and the times of the start of transmission assigned to stop pulses representing digits of successive magnitudes differ by ½ millisecond. Thus, digit 1 is represented by a start pulse followed by a stop pulse which reaches its peak value 4 milliseconds after the start pulse reaches its peak value, digit 2 is represented by a start pulse followed by a stop pulse which reaches its peak value 4½ milliseconds after the start pulse reaches its peak value, and so on. It will be observed that the stop pulse for the digit 0 reaches its peak value 8½ milliseconds after its start pulse and 4 milliseconds before the next succeeding start pulse. Thus, there is provided an interval of time of 4 milliseconds for the decay of the start pulse, 9 increments of time of ½ millisecond each for the generation of a pulse at any one of the ten times necessary to represent the various digits, and a last increment of time of 4 milliseconds, all of the latter being required to permit a stop pulse to decay, only if it should occur at the end of the ninth increment of time. Consequently, 12½ milliseconds of time elapse between the start pulses of succeeding digits, from which it follows that 12½ milliseconds are required in this exemplary system to transmit each character designating the called number. In order to indicate the starting point of the transmission of a called number, a time interval of approximately 25 milliseconds during which no pulses are transmitted is provided at the beginning of each pulse representation of a called number. Thus, a time interval of 125 milliseconds is required to transmit each eight-digit called number and the accompanying no-signal period. The foregoing exemplary times are based upon a supply frequency of 40 cycles per second. This invention is not limited to these times or to this driving frequency. Driving frequencies as high as 55 and 60 cycles per second have been used without materially changing the circuits. However, when desired, higher or lower frequencies may be used by making minor changes in the circuit constants in well understood manners.

In accordance with this exemplary embodiment of the invention the signaling pulses are generated by saturation-type pulse generating transformers. There are two transformers, one for the digit pulse representing the digits 0 to 9 and one for the start or reference pulse. The excitation current for the apparatus of the exemplary embodiment set forth herein is sinusoidal in form and is usually transmitted from a power source usually located at the central office over the line which interconnects the signaling station with the central office. This current is an alternating current of sinusoidal wave form, and at the signaling station the current is passed through phase shifting networks 202 and 203 so that the current is converted to a two-phase source in which the two currents are substantially 90 degrees out of phase.

Of course, the exciting current may be supplied locally at the subscriber's station when so desired or required or from some other point to which the subscriber's line extends.

The start pulse generating transformer has a single output winding and two input windings. The input windings of this transformer are interconnected and connected with the two phases of the excitation current so that one phase of the excitation current is applied to one input winding and the other phase of the excitation current is applied to the other input winding.

The stop pulse generating transformer or coil has a single output winding and a single input winding which input winding is provided with a plurality of taps. The end terminals of this input winding are connected to two phases of a polyphase source of alternating current. The two phases are also connected to one of the taps of this input winding. The time of occurrence of the pulse generated by this transformer or coil is controlled by varying the tap to which the two phases are connected.

The output windings of the transformers are connected across the line.

The magnetic core of each transformer is designed to be saturated except for very small values of ampere turns, and an electric pulse is generated in the secondary winding of each transformer when the flux is changed from saturation at one polarity to saturation at the other polarity. The flux induced in the core of each transformer depends upon the number of turns in the two primary windings of the transformer and upon the current flowing in each winding.

As shown in the drawing, both the start pulse coil 310 and the stop or digit pulse coil 301 are provided with primary windings, thus allowing adjustment of the time of occurrence of both the start pulse and stop pulses relative to the respective phases of the current applied to these windings. The input windings of the start pulse coil are shown connected in parallel with the input winding of the stop pulse coil. However, when desired these windings may be connected in series and the coils operate in substantially the same manner as described herein.

As shown in the drawing, the stop pulse coil is provided with a single winding connected to phase A from network 202 and to phase B from network 203. The taps of the winding are connected to ground and thus to the source of alternating current and the particular tap to which ground is connected determines the number of ampere turns applied to the core of the transformer 301 from both phases A and B, and in this manner controls the time of occurrence of the induced pulse in its output circuit.

The manner in which the number of ampere turns applied to the windings connected to phase A and to phase B of the stop pulse coil 301 controls the time of occurrence of the output pulse may be more readily understood by reference to Figs. 10, 10A, 10B, 10C, 10D and 10E.

Fig. 10 shows the possible times of occurrence of the start and stop pulses. Thus in the exemplary embodiment set forth herein there are ten different times during which a stop pulse may occur designating the identity of the digit or symbol of the called subscriber's station designation.

Fig. 10A shows the ampere turns applied to the core of the start pulse coil 310 by both phase A and phase B and the time of generation of the start pulse as a result.

Fig. 10C shows the ampere turns applied to the core of coil 301 when it is desired to generate a pulse representing the digit 5. In this case the number of ampere turns of phase A and phase B is about equal so that the tap for the digit 5 will be in about the middle of the input winding of coil 301. When it is desired to generate a stop for a lower valued digit the ampere turns applied by the coil excited from phase A is increased and the number of ampere turns applied by phase B is decreased as shown in Fig. 10B, for example. Fig. 10B shows the ampere turns and the output stop pulse which represents the digit 1. In other words, the ground is connected to a tap near the top of coil 301 as shown in Fig. 4.

Figure 4:
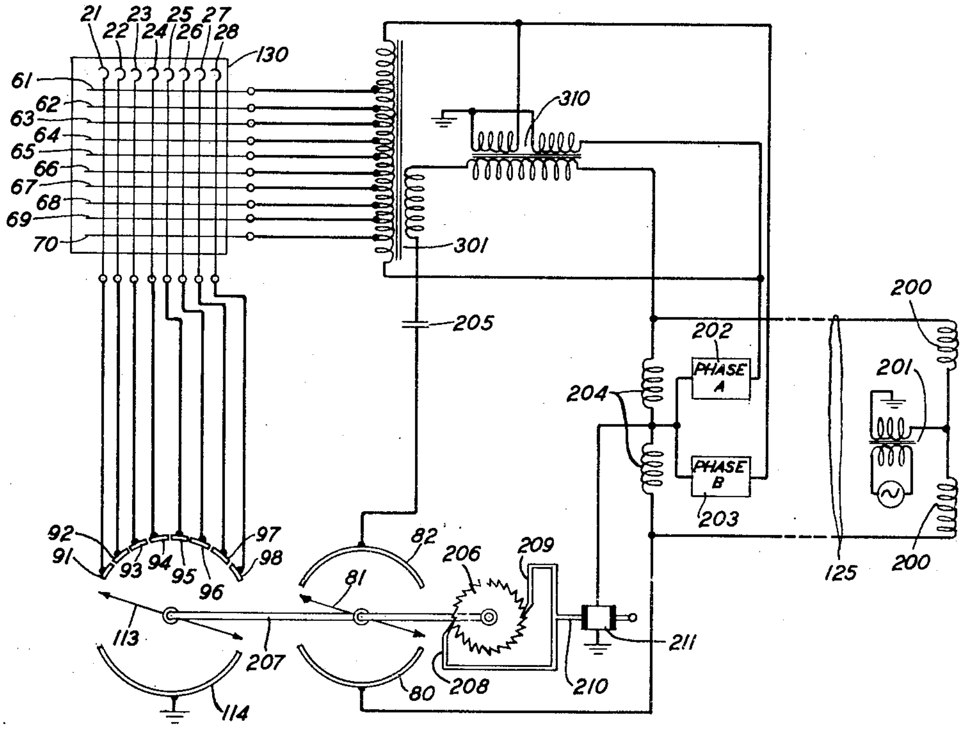
Fig. 4 shows the manner in which the dial, the stepping mechanism, the pulsing transformers, and other equipment are interconnected and cooperate one with another and with the telephone line.
Figure 5:
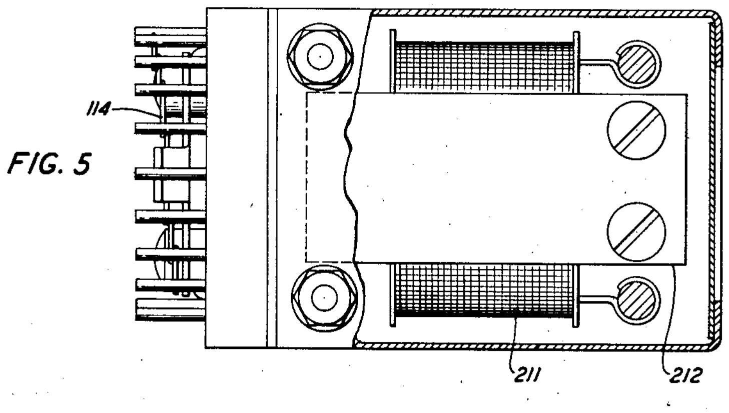
Fig. 5 is a top view, partially broken away, of the stepping mechanism.
Figure 7:
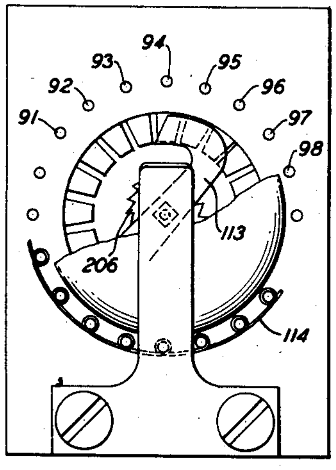
Fig. 7 is a front view, partially broken away, of the stepping mechanism.
Figure 6:
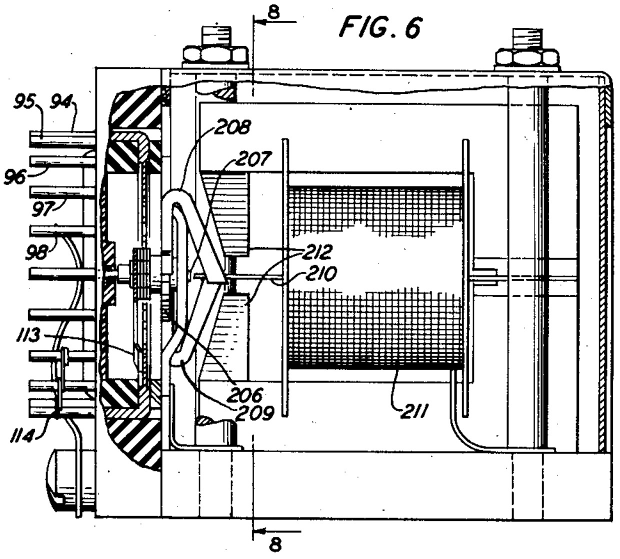
Fig. 6 is a side view, partially broken away, of the stepping mechanism.
Figure 8:
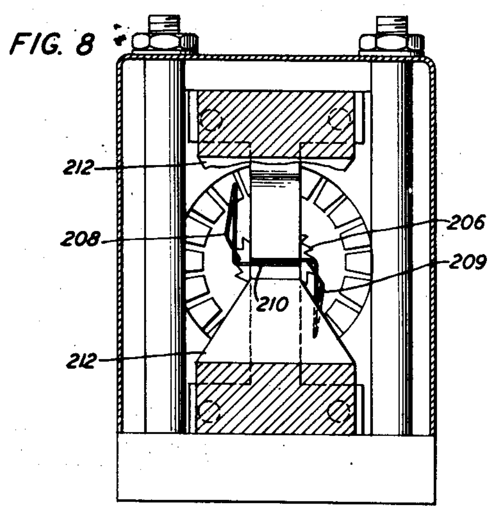
Fig. 8 shows a section, partially broken away, taken along section line 8 of Fig. 6.
Figure 9:
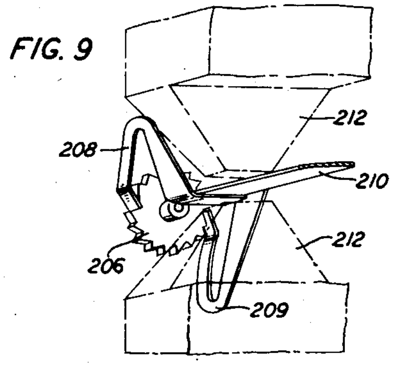
Fig. 9 is a partial disclosure of the stepping mechanism showing the pole-pieces, the armature and stepping pawls, and the ratchet wheel.

When it is desired to generate and transmit a stop pulse representing a higher valued digit ground will be connected to a tap nearer the lower end of coil 301 as seen in Fig. 4. As a result the ampere turns applied by phase A are decreased and the ampere turns supplied by phase B increased. Of course, in locating the various taps on the winding, consideration must be given to the impedance of the two circuits for phases A and B. One method of operation is to have the splitting networks 202 and 203 operate as constant current sources. If networks 202 and 203 supply substantially constant current then the number of turns in the winding on each side of the ground connection largely determines the ampere turns applied from each phase and thus the time of occurrence of the output pulse. Furthermore, since these turns are varied in opposite manners the total number of ampere turns applied to the core of coil 301 is more constant for the different digits than in the arrangement disclosed in the above-identified Parkinson application Serial No. 131,875. In addition, inasmuch as the pulses are generated only during the time the total flux passes through zero as described above, and due to the fact that the core is saturated at a low number of ampere turns, variations in the amplitude of the output pulse under different signaling conditions are substantially reduced or eliminated.

The output or secondary windings on both coils 301 and 310 are connected in series and the series combination of these coils connected through condenser 205, distributor segment 82, distributor brush 81, distributor segment 80, and then to the subscriber's line extending to the central office. This line is closed through distributor segment 81 and distributor brush 82 at all times except during the pause between the transmission of complete subscriber's designations. During this pause neither of the output circuits nor output windings of the pulse coils are connected to the line extending to the central station. Consequently, they transmit no pulses during this silent interval.

The condenser 205 is connected in series with the series combination of the output windings of these coils to the line extending to the central office. This condenser and coil windings are provided to control the shape and duration of the pulses. The capacity of this condenser is selected so that the products of its capacity and the resistances in the circuit are less than the pulse time or interval, so that the shape of the pulse transmitted to the line is largely determined by the constants of this condenser and the other circuit elements. The condenser 205 represents a simple coupling network. However, any coupling network having a suitable degree of complexity which will provide the necessary shaping of the pulses may be employed.

It should be noted that a pulse is generated for each half cycle of the applied current in both the start pulse coil 310 and the stop pulse coil 301. It should also be noted as shown in Fig. 10 as well as Figs. 10A, B, C and D that a start pulse and its accompanying stop pulse are of one polarity while the next stop pulse and next start pulse are both of the same polarity but of opposite polarity to the immediately preceding start and stop pulses.

Line 10E shows the pulses transmitted over the line to the central station where they control switches as described hereinbefore for setting up communication paths.

Figures 1, 2, 3:
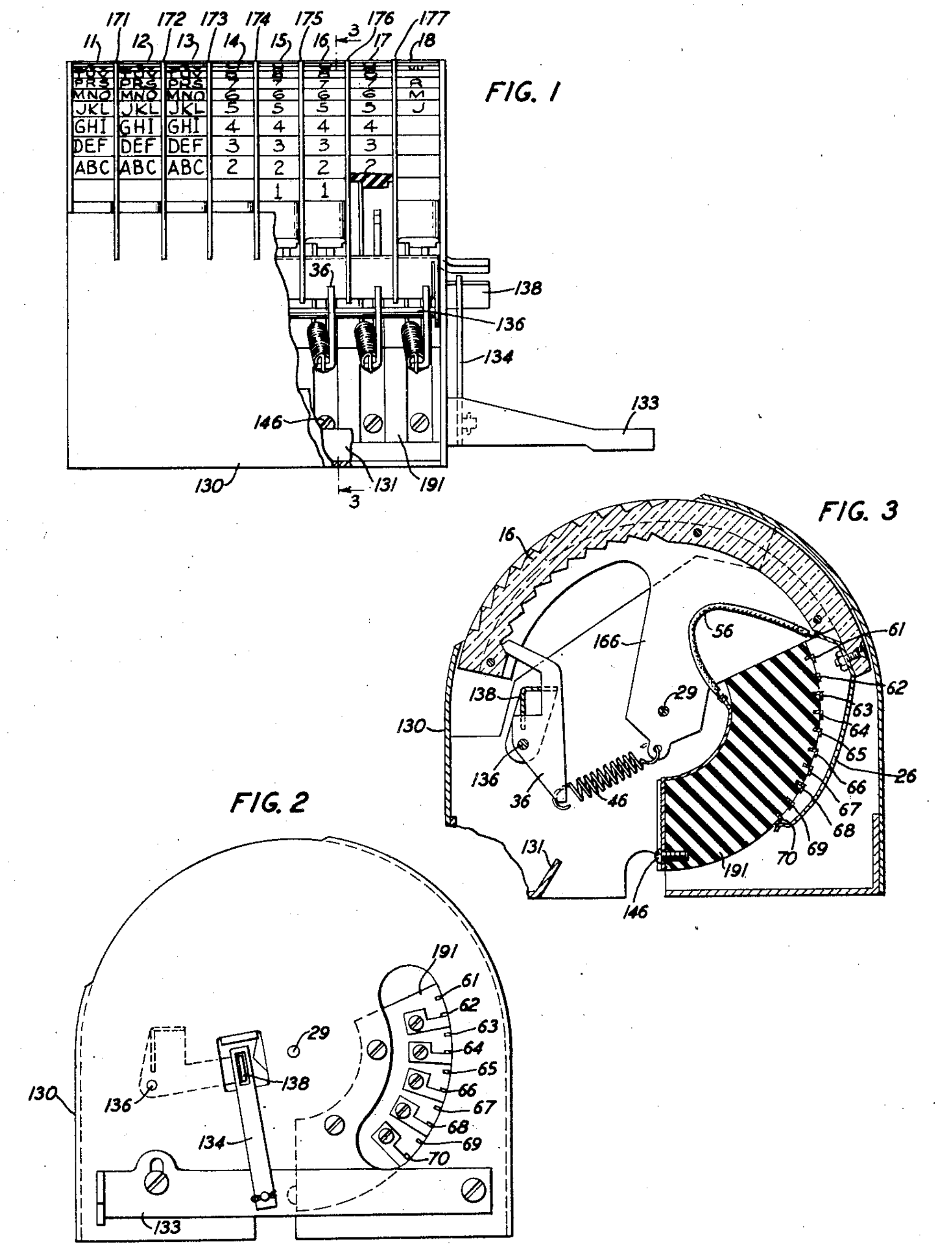
Fig. 1 is a front view, partially broken away, of the dialing apparatus.
Fig. 2 is a side view of the same apparatus.
Fig. 3 shows a section taken along section line 3 of Fig. 1.

Figs. 1, 2 and 3 indicate one embodiment of the selector switch. It is enclosed in case 130, with selector dials 11 to 18 and release lever 133 accessible to an operator. The selector dials are made of a non-conducting material such as hard rubber or plastic, and each dial is provided with ten indentations along its outer periphery. Each indentation is designated by a letter or number conforming to the telephone signaling system, and each is of suitable configuration to permit an operator's finger to engage and move the dial. The selector dials are separated by spacers 171 to 177 which are attached to case 130. As indicated in Fig. 3, each dial is attached to an individual support 166 so that each dial may be moved approximately one-fourth of a revolution about shaft 29. The inner surface of each dial is provided with ten grooves which correspond to the finger indentations on the outer periphery of the dial. The grooves on each dial serve to engage with a detent pawl to secure each dial in one of the ten possible positions as selected by the operator. As indicated in Fig. 3, detent pawl 36 which engages to dial 16 is pivoted about shaft 136. Spring 46 is attached between support 166 and pawl 36 so that pawl 36 is normally forced against dial 16, thereby securing the dial in a fixed position by engaging with one of the ten grooves. Spring 46 also serves to apply a continuous force to support 166 which tends to rotate support 166 and dial 16 in a clockwise direction about shaft 29. The grooves on the dials and the detent pawls are shaped and positioned so that by pressing upon the finger indentations in a dial an operator can move the dial in either direction and so that the ratchet action of the pawl against the grooves secures the dial in any one of the ten positions to which it may be moved. The rotary movement of the dials is limited to about one-fourth of a revolution by stop 131 and insulator 191.

Release arm 138 is connected with release lever 133 through lever 134 and is provided with slots to engage each detent pawl. When lever 133 is in its normal position, arm 138 permits each detent pawl to engage with a groove in the corresponding dial. When lever 133 is depressed, arm 138 is moved in a clockwise direction about shaft 136 and the detent pawls are disengaged from the dials, thereby permitting the spring associated with each dial to cause each dial to return to its initial position.

A spring contact is connected to each dial, and each dial and spring contact may be moved so that the spring contacts may be connected with any one of ten conductors. As indicated in Fig. 3, spring contact 26 is attached to dial 16 and it is electrically connected to terminal 146 through conductor 56. Insulator 191 supports the various terminals and conductors, and the ten conductors 61 to 70 which may be contacted by spring contacts 21 to 28 are mounted thereon.

Figs. 5, 6, 7, 8 and 9 indicate one embodiment of the stepping device and distributor. The distributor comprises two brushes 113 moving over a set of contacts. Contacts 91 to 98 and the eight contacts bonded by conductor 114 serve as distributor elements. The brushes are driven by ratchet wheel 206 through shaft 207. The ratchet wheel is driven by stepping pawls 208 and 209 which are attached to magnetic reed 210. The magnetic structure is polarized by permanent magnet 212 and magnetic reed 210 is actuated by coil 211. When an alternating current is applied to coil 211, the magnetic polarity of reed 210 is changed each half cycle of the alternating current so that the reed moves both upward and downward during each cycle of the alternating current. Each time reed 210 moves upward or downward ratchet wheel 206 is moved one step by one of the stepping pawls. Thus, ratchet wheel 206 and rotor 113 are moved one step during each half cycle of the alternating current.

In the embodiment of this invention shown in Fig. 4, the alternating current to energize the stepping device and provide the excitation current for the pulsing transformers is supplied through a simplex circuit. The alternating current is applied between the two line conductors 125 and ground. The interconnection between the source of alternating current and the two line conductors is simplex coil 200 having similar electrical properties to simplex coil 204. The source of alternating current is connected between the center tap of coil 200 and ground through transformer 201. Thus, the potential between the center tap of coil 204 and ground corresponds to the potential developed across the secondary of transformer 201. In this manner the alternating current to operate the stepping mechanism and to serve as the excitation current for the pulsing transformers is transmitted over the telephone line.

In operating the calling device in accordance with this invention the subscriber will first position the dials or finger wheels 11 through 18 inclusive, in accordance with the digits, characters or symbols of the called subscriber's station designation or number. Actuation of these selecting devices will cause the members 21 through 28 to selectively make contact with the bus-bars 61 through 70, and thus connect ground to the various taps of the input winding of the pulse coil 301. Thereafter the subscriber will initiate a call which in turn causes alternating current power to be applied between both conductors to the subscriber's line 125 and ground, through transformer 201 and simplex coil 200, for example. The alternating current is then transmitted to the subscriber's station where it actuates the stepping magnet 211 and causes the brush arms 113 and 81 to rotate one step for each half cycle of alternating current. Likewise, during each half cycle of the alternating current, a start pulse is generated in the output winding of the start pulse coil 310 and a pulse is also generated at a later interval of time during the same half cycle in the output winding of the stop pulse coil 301.

Assuming that the distributor brush arms 113 and 81 start from the position shown and are rotated in a clockwise direction by the stepping magnet 211, during the first half cycle of the alternating current, arms 113 and 81 will complete a circuit from segment 91 to ground and between segments 80 and 82, respectively. In completing a circuit between segments 80 and 82 the output windings of coils 301 and 310 are connected through the pulse-forming network or condenser 205 to the conductors of the subscriber's line 125 extending to the central station. The connection of segment 91 to ground through brush 113 and segment 114 connects ground to one of the taps of the tapped input winding of coil 301. The particular tap to which ground is connected is controlled by the setting of the contacts carried by the dial or finger wheel 21.

During each subsequent half cycle the succeeding segments 92 through 98 are successively connected to ground and each of these segments in turn connects ground to one of the taps of the stop pulse coil 301 in accordance with the setting of the corresponding dial or finger wheel, thus causing the transmission of stop pulses at varying time intervals after the transmission of the start pulse in accordance with the setting of the various dials or hand wheels at the calling subscriber's station.

After eight digits have been transmitted the brush arms 113 and 81 make contact with no other segments, with the result that for two half cycles, that is, two steps of the stepping magnet 211, no pulses are transmitted, thus indicating that a complete called station designation has been transmitted. Thereafter the above cycle of operations is repeated and the various pulses repeated so long as the alternating current power is connected to the line at the central office or some other station, or supplied locally.

What is claimed is:

1. In a telephone dialing system in combination, apparatus for generating a pulse for each digit representing a subscriber's number comprising a pulse coil having a core of saturable material, a single primary winding wound on said core, a plurality of taps connected to said winding, a source of polyphase alternating currents having a common connection for supplying alternating currents of different phases to the opposite ends of said primary coil, apparatus for selectively connecting said common point of said polyphase alternating currents to one of said taps for controlling the time the flux through said core passes through zero, an output winding on said core having a pulse induced therein when the flux through said core passes through zero.

2. In combination in a telephone calling system, apparatus for generating two pulses of short duration for each symbol of a called designation, a start pulse coil comprising two input windings and an output winding, a source of polyphase alternating current having a neutral point, means for connecting one phase of said polyphase current to each of said input windings, a stop pulse coil comprising a signal input winding, a plurality of taps connected thereto, means for supplying a different phase of said polyphase alternating current to the end terminals of said input winding, means for selectively connecting a neutral point of said polyphase system to one of said taps in accordance with the identity of the symbol to be represented by the pulses generated by said coil, an output winding interlinking both of said coils, and signal transmission means connected to said output circuit.

3. Call signal generating apparatus comprising two impulse coils having saturable ferromagnetic cores, a source of polyphase alternating currents having a neutral or common connection, a plurality of input windings interlinking one of said cores, connections from each of said input windings to a different phase of said polyphase alternating current source, a single winding interlinking the other of said cores, connections from said winding to a plurality of said phases of said source, a plurality of taps connected to said single winding, a manual selector switch and a distributor connected to said taps for selectively connecting one of said taps to said common or neutral connection of said polyphase current source, an output winding interlinking both of said cores, a transmission circuit connected to said output windings, alternating current magnet for advancing said distributor connected to one of the phases of said source.

KERMIT S. DUNLAP.
CLARENCE A. LOVELL.

No references cited.